March 26, 1963 M. SWETLITZ 3,083,286
PLIANT SURFACE HEATING UNIT
Filed Sept. 1, 1960

INVENTOR.
Myron Swetlitz
BY
Andrew B. Hubbard
Atty.

United States Patent Office 3,083,286
Patented Mar. 26, 1963

3,083,286
PLIANT SURFACE HEATING UNIT
Myron Swetlitz, Skokie, Ill., assignor to General Electric Company, a corporation of New York
Filed Sept. 1, 1960, Ser. No. 53,431
5 Claims. (Cl. 219—19)

The present invention relates to heating units and more particularly to heating units which are utilized to supply heat to an exposed surface to heat articles thereon.

The invention has as its major object to provide a pliant heating surface which has improved heat transfer characteristics.

The invention has as its further object to provide a heating unit having a pliant top surface which will conform to the surface contour of an object being heated thereon.

It is a further object of the invention to provide a heating unit including a constricted mass of material which will be plastic within the normal operating range of the unit at which time the mass may shape itself to the bottom surface contour of an object being heated.

It is a still further object of the invention to provide a heating unit including a mass of metallic material which is fusible at comparatively low temperatures and is sandwiched between a base layer of imperforate heat transfer material and a metallized, heat resistant fiber which serves to provide an abrasion-resistant, deformable exposed heating surface.

To attain these objects the present invention employs a heater which may be of the sheathed, resistance element type. This heater may be affixed in good heat transfer relation to the underside of a metal plate having good heat conduction characteristics. The plate has above it a mass or layer of metallic material which has a melting point within the normal operating range of the heating unit. For example, tin is generally considered to have a melting point of about 449° F. The mass is restrained from movement upwardly or laterally by a firmly positioned sheet of metallized fiber such as aluminized fiberglass. Aluminized fiberglass has been chosen as an exemplary surface material since it is sufficiently close-knit to confine the molten material, is heat-resistant yet heat-conductive, is impervious to most liquids, has good abrasion-resistance, and is flexible while providing a readily cleanable surface. Any other material which provides or approximates this combination of qualities could be employed in the place of the metallized fiber chosen.

The structure as described, therefore, provides a surface which when heated will deform to conform to the lower surface of an article being heated and will as a result have intimate heat transfer contact along the entire lower surface of the object being heated. For example, consider a container such as a pot containing food to be cooked. Pots under normal circumstances are knocked about rather freely and as a result, their bottom surfaces may become concave, slightly convex or somewhat irregular in contour. Normally, when a pot is placed on a heating surface, heat is conductively transferred to the pot only in areas planarly contacting the heating surface. The remainder of the heat produced must then be transferred by convection which, at best, is a generally inefficient process. Utilizing the present invention, the heater heats the mass of metal to its molten state whereupon the weight of the pot being heated will cause the pot to seat itself within the molten mass. The lower surface of the pot will thereby have intimate surface contact with the heated mass along subsantially all of its lower surface area thus insuring a greater amount of conductive heat transfer between the heating source and the object being heated, i.e. the pot and the food contained in it. In this way, a greater percentage of the generated heat is transmitted to the pot being cooked and less time and power are required to cook the food to the desired end point.

The invention both as to its organization and principle of operation, together with further objects and advantages thereof may best be understood by referring to the following specification taken in connection with the accompanying drawings of which:

Figure 1:
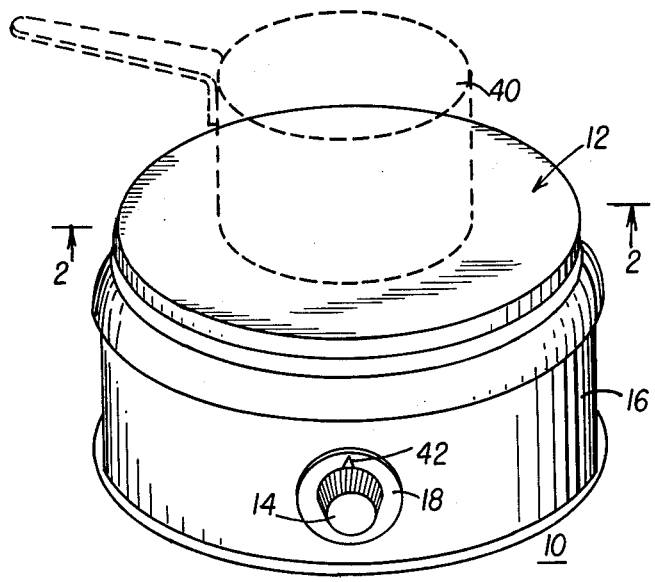
FIG. 1 is a front perspective view of a heater employing the present invention.

In FIG. 1 there is shown a surface heating unit 10 of the type commonly called a "hot plate." Units such as 10 are generally provided with a source of heat which serves to generate heat for transmission to the exposed surface 12 of the unit. Objects to be heated may be placed directly on the upper exposed surface, or on the surface within material handling devices such as handled containers and the like. A suitable temperature-controlling, manually adjustable knob 14 may be secured to protrude from the enclosing casing 16 for accessibility from the exterior of the casing. The knob may be used to control a generally known potentiometer within the casing which serves to vary the input to the heater or the knob control may be used to set the operating range of a temperature limiting thermostat in a generally known manner. Suitable indicia (not shown) may be arranged radially about the knob 14 on stationary plate 18 to indicate the knob setting points.

Figure 2:
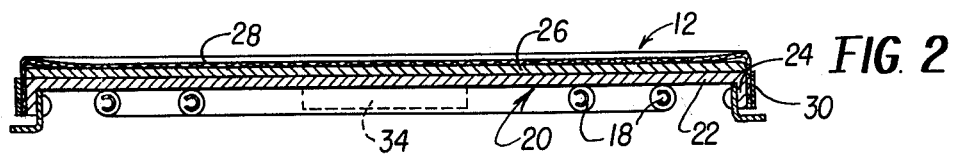
FIG. 2 is a sectional view taken along the lines 2—2 of FIG. 1.
Figure 3:
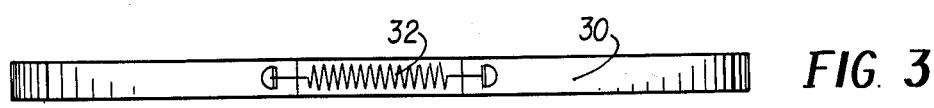
FIG. 3 is a side elevational view of the restraining band of FIG. 2.

In FIG. 2 there is shown the exposed heating surface 12 and the pertinent functioning structure for its mounting within casing 16. The structure includes a heating element 13 which may be of the sheathed type having a coiled resistance conductor housed in a metallic sheath and supported in uniformly spaced relationship to the sheath by a highly compacted mass of suitable heat-conducting and electrically insulating material such as powdered magnesium oxide. Heating elements of this type may be constructed as described in U.S. Patent 1,367,341 issued to C. C. Abbott on February 1, 1921. Conventionally such heating elements are arranged to form flat spirals of several convolutions nested within one another to provide a circular heat generating surface 20. For the present embodiment the sheath of the heat source may be welded to the underside of surface plate 22 to insure good heat transfer relation therebetween. Alternatively suitable support structure or clamping devices (not shown) may be used to sustain the heating unit sheath in good heat transfer relation with the heat transfer plate 22. Plate 22 may be fabricated from a good heat conductive metal such as aluminum. The plate as shown in the present embodiment is circular in surface extent with an annular flange 24 depending evenly from the plate periphery. It has been found that with a plate 22 of approximately one-eighth inch thickness, good results are effected.

To provide the flexibility of heat exchange surface which is an important attribute of the present invention, I cover the upper surface of heat transfer plate 22 with a mass or layer 26 of a relatively low melting point material. This mass 26 should be of material which has good heat conducting properties and which reaches its molten state at temperatures within the range normally expected of sheathed heaters or within the range of temperatures usually encountered in surface heating. For example, an adequate range is of the order of from 350°

F. to 750° F. The material used should be one of the metals such as indium, bismuth, tin or alloys utilizing these metals. On a practical basis, it has been found that of the possible materials listed, tin provides the best combination of required properties. For example, a layer of tin slightly less than one-quarter of an inch has been found to perform quite satisfactorily.

The heat transfer mass 26 is constrained in position on plate 22 by sheet 28 which covers layer 26 and forms the exposed flexible surface for the unit. The sheet 28 must, of course, be sufficiently large to cover the entire circular upper face of plate 22 and optimally should be of the range of .010″–.015″ thick. The sheet has its edges downturned about the periphery of plate 22. A suitable band or strip 30 of springlike sheet metal may be fitted about the downturned sheet portion. By means of tension spring 32 or by use of a turnbuckle (not shown) in its stead, the band ends may be tightly compressed about the downturned sheet portion to hold the sheet firmly and tautly against flange 24 along its entire peripheral extent. The characteristics of a suitable sheet material for use herein require that the sheet be a heat conductor, be flexible, heat-resistant, and abrasion-resistant, and lastly be able to properly confine the layer of molten material at the elevated temperatures to which the sheet is to be exposed while functioning. By present technical standards, suitable materials would advantageously comprise thin sheets of metallized fibers such as aluminized fiberglass, stainless steel foil on fiberglass or available woven wire fabrics. These materials although considered insulators when of greater mass and thickness do not impede the flow of heat due to the thinness of sheet involved. As fitted to the present invention, sheet 28 is held rigidly at the periphery of plate 22 while providing a somewhat flexible area about the central axis of the unit. As can further be seen in FIG. 2, sheet 28 is cambered upwardly and outwardly from its center to allow for expansion and contraction of the layer of fusible material held within. A suitable thermostat 34 may be affixed centrally to lower surface 20 of plate 22. This thermostat, of any generally known design such as bimetal, may be used to control the operating temperature as previously mentioned or may simply comprise a high temperature shut-off. For optimum operation, this thermostat should be located, as shown, centrally within the coils of heater 18 to contact plate 22 in good heat transfer relation.

The reasons for the use of a sheet 28 having the previously described characteristics may be explained as follows: The close-knitted characteristic of the sheet material serves to confine molten mass 26 from movement vertically and from contact with the bottom surface of the object being heated. Further, the liquid impervious characteristic of the sheet material, previously mentioned, serves to isolate the molten mass from contact from liquid spillage which might occur. By utilizing these characteristics, the object being heated cannot adhere to the molten mass nor could eruptions of molten metal occur following inadvertent spillage of liquid onto the upper exposed surface 12. With a readily cleanable, liquid-impervious surface, any such spillage will remain on the surface or roll off the edges, in either instance of which no damage can occur and the spillage can readily be cleaned.

The operation of this embodiment is as follows: The object to be heated is placed on exposed surface 12. This object for exemplary purposes may be considered to be a pot 40 (FIG. 1) containing water to be boiled. The knob 14 is then rotated until the pointer 42 is set with respect to the adjacent indicia for the water boiling temperature of 212° F. Heating element 18 is thereby energized and its resistance heat is transmitted through plate 22, layer 26 and sheet 28 to pot 40.

The temperature of plate 22 and layer 26 continue to increase as more heat is transmitted. The layer 26 (if made of tin) begins to melt as its internal temperature approaches 450° F. The layer then becomes generally molten and yields to the pressure exerted by pot 40. The upper contours of the layer deform to conform to the bottom contours of pot 40 within the confined limits allowed by confining sheet 28. Thus an intimate heat transfer between the heat transfer layer and the pot being heated is insured over the entire bottom surface of the pot.

If during this heating period, the temperature of plate 22 reaches the shut-off temperature of the thermostat 34 which should be preset to 700° or 800° F., the temperature through a suitable, obvious circuit would de-energize the heater and allow the plate to cool down to allowable temperatures.

Figure 4:
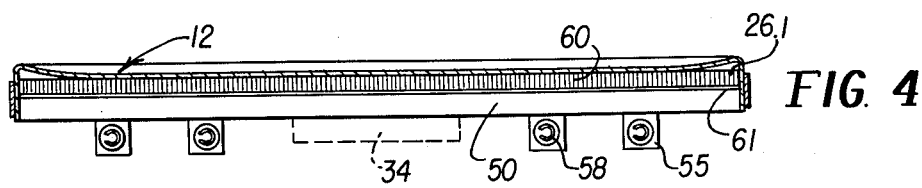
FIG. 4 is a side sectional view of an alternate embodiment of the heater of FIG. 2.

The embodiment of FIG. 4 utilizes in place of a separate heater and bottom plate, a plate having the depending integral emboss 55. Emboss 56 is formed in continuous helical fashion beneath the plate proper and has embedded within itself the resistance heating element 58. Further this embodiment includes a variant in the construction of the fusible metal layer. In FIG. 4, within the layer 26.1 of fusible metal such as shown in FIG. 2 and previously described, there is shown a plurality of filaments 60 of such metal as aluminum which may be of the nature of grown fibers secured in a suitable manner to an aluminum lamina 61 which would fit above the plate 50. The lamina 61 and the fibers give a brush-like appearance. Alternatively, the filaments may be in a heterogeneously arrayed mattress form. In either case, the mass, so formed, is flexible and the interstices between the filaments will be filled by the metal in layer 26.1 while in the molten state. By this usage, when the metal layer 26.1 reaches its fused state, it will yield to the pressure exerted by the pot carried on the upper surface. The filaments will also yield to this pressure but due to the increased conductivity difference between the conductivity of aluminum and that of the molten metal layer, the heat transfer efficiency of this embodiment will be superior to that previously described. It should be noted that use of a brush, as described, without the molten metal filler would result in conductivity of heat only through the fine wire filaments. The interstices or air spaces between the filaments would impede the heat flow and would serve as an insulating barrier thus somewhat defeating the intended purpose.

Within the previously described structures, numerous other heating unit types and configurations could be employed. For example, a sheathed heater or any other resistance heater such as a coated glass heater could be positioned within the base of the fusible layer with an insulator below. This usage would minimize the heat transfer path and increase the effectiveness of the heat input. Alternatively coated wire resistance heaters could be embedded in the aluminum base plate or within the brush plate to supply heat to the flexible surface.

While there has been described what is presently considered to be the preferred embodiment of the invention, it will be understood that various modifications may be made therein, and it is intended to cover in the appended claims all such modifications as fall within the true spirit and scope of the invention.

What is claimed is:

1. A heating unit adapted to provide a top heating surface, said unit comprising heat generating means positioned below said surface, a brush-like layer of heat-conducting material, a mass of material, fusible within the normal operating range of said heating unit forming a solid matrix about said brush, means for containing said brush and said material mass comprising a member interposed between said material mass and said heat generating source for thermal conductivity therethrough, said containing means further comprising a flexible, heat-resistant surface forming said top heating surface, said flexible surface deformable under the weight of objects to be heated along with said mass of material in the fused state to thereby conform to the bottom surface contours of said object being heated by said unit.

2. A heating unit for heating cooking vessels and the like, comprising structure providing a first plate of heat transfer material, a second plate of heat transfer material disposed on said first plate in good heat transfer relation therewith, said second plate comprising metallic material having a softening point within the temperature range of from 350° F. to 750° F., means for heating said first plate to a temperature rendering the second plate plastic, a flexible cover disposed over said second plate and having a skirt portion extending downwardly about said first plate, said cover being substantially impervious to passage of liquids therethrough, and means for securing said cover about said first and second plates to establish contact of said cover with said second plate over substantially the full area thereof while affording space above the periphery thereof to accommodate thermal expansion and the displacement of the material of the second plate under the weight of a cooking vessel thereon.

3. A heating unit for heating cooking vessels or the like, comprising a first heat conductive plate, a second heat conductive plate disposed thereon in good heat transfer relation therewith, said second plate comprising a metallic composition having a softening point within the temperature range of from 350° F. to 750° F., said composition having dispersed therethrough a quantity of fibrous material having a softening point substantially above 750° F., means for heating said first plate to a temperature rendering plastic the metallic composition of the second plate but below the softening point of the fibrous material, a flexible cover disposed over said second plate and extending downwardly about said first plate, said cover being resistant to passage of liquids therethrough, and means for securing said cover about said first and second plates in contact with said second plate over substantially the full area thereof.

4. A heating unit according to claim 3, in which the metallic composition of said second plate is essentially tin.

5. A heating unit according to claim 3, in which the fibrous material comprises filaments of aluminum.

References Cited in the file of this patent

UNITED STATES PATENTS

| | | |
|---|---|---|
| 963,892 | Haskins | July 12, 1910 |
| 2,090,570 | Claessen | Aug. 17, 1937 |
| 2,352,899 | Karlson | July 4, 1944 |
| 2,702,334 | Kleist | Feb. 15, 1955 |

FOREIGN PATENTS

| | | |
|---|---|---|
| 770,111 | Great Britain | Mar. 13, 1957 |